(12) United States Patent
Hirai et al.

(10) Patent No.: US 6,962,441 B2
(45) Date of Patent: Nov. 8, 2005

(54) ROTARY MEMBER AND PRODUCTION PROCESS

(75) Inventors: Eiji Hirai, Kanagawa (JP); Mitsuhiro Okuhata, Kanagawa (JP); Nobuo Kino, Kanagawa (JP); Keizo Otani, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 53 days.

(21) Appl. No.: 10/295,038

(22) Filed: Nov. 15, 2002

(65) Prior Publication Data

US 2003/0169955 A1 Sep. 11, 2003

(30) Foreign Application Priority Data

Nov. 27, 2001 (JP) .......................... 2001-360946

(51) Int. Cl.[7] .............................. F16C 17/00
(52) U.S. Cl. ................... 384/7; 29/898.12; 29/898.13; 384/91; 384/276; 384/913
(58) Field of Search ............................. 384/7, 91, 912, 384/913, 276; 29/898.12, 898.13

(56) References Cited

U.S. PATENT DOCUMENTS

| | | | |
|---|---|---|---|
| 2,980,987 A | | 4/1961 | Lamson et al. |
| 4,508,396 A | | 4/1985 | Doi et al. |
| 4,886,585 A | | 12/1989 | Martinou et al. |
| 4,946,747 A | * | 8/1990 | Bergmann et al. ........... 384/912 |
| 5,150,974 A | | 9/1992 | Tamada et al. |
| 5,927,865 A | | 7/1999 | Ito et al. |

FOREIGN PATENT DOCUMENTS

| | | |
|---|---|---|
| JP | 63-180722 A | 7/1988 |
| JP | 2-190615 A | 7/1990 |
| JP | 5-255809 A | 10/1993 |
| JP | 8-177864 A | 7/1996 |
| JP | 2001-20958 A | 1/2001 |

OTHER PUBLICATIONS

S. Nozaki et al., "Brittle Flaking on Bearings for Electrical Instruments and Auxiliary Devices and Life Extensions of these Bearings", NTN Tecnical Review No. 61, 1992.
K. Tamada et al., "A New Type of Microstructural Change in Bearings for Electrical Instruments and Auxiliary Devices of Automotive Engines", NTN Technical Review No. 61, 1992, pp. 29–35.
Y. Murakami et al., "Study on Fatigue Mechanism of Bearings for Automotive Alternators", NSK Technical Journal No. 656, 1993, pp. 1–14.
K. Sato et al., "Hydrogen Embrittlement of a Compressor Thrust Bearing with Replacement Refrigerant HFC 134a", Tribologist, vol. 37, No. 11, 1992, pp. 918–922.
U.S. Appl. No. 10/295,042, filed Nov. 15, 2002, Hirai et al.
Y. Fukai, "The Metal—Hydrogen System—Basic Bulk Properties", Springer–Verlag (1993), pp. 229–230.
Bulletin of Japan Institute of Metals, 24 (1985), pp. 707–715.

\* cited by examiner

*Primary Examiner*—Lenard A Footland
(74) *Attorney, Agent, or Firm*—Foley & Lardner LLP

(57) ABSTRACT

A rotary member such as a member of a bearing, a rotating member of a transmission or a gear for a motor vehicle, includes a base region of a ferrous base material such as a steel. The rotary member is formed with a hydrogen blocking layer formed in a contact surface for contacting with a mating body in a relative motion. The hydrogen blocking layer includes a concentrated portion formed in the base region and made of a substance lower in hydrogen diffusion coefficient than the base material.

20 Claims, 14 Drawing Sheets

A-TYPE

B-TYPE

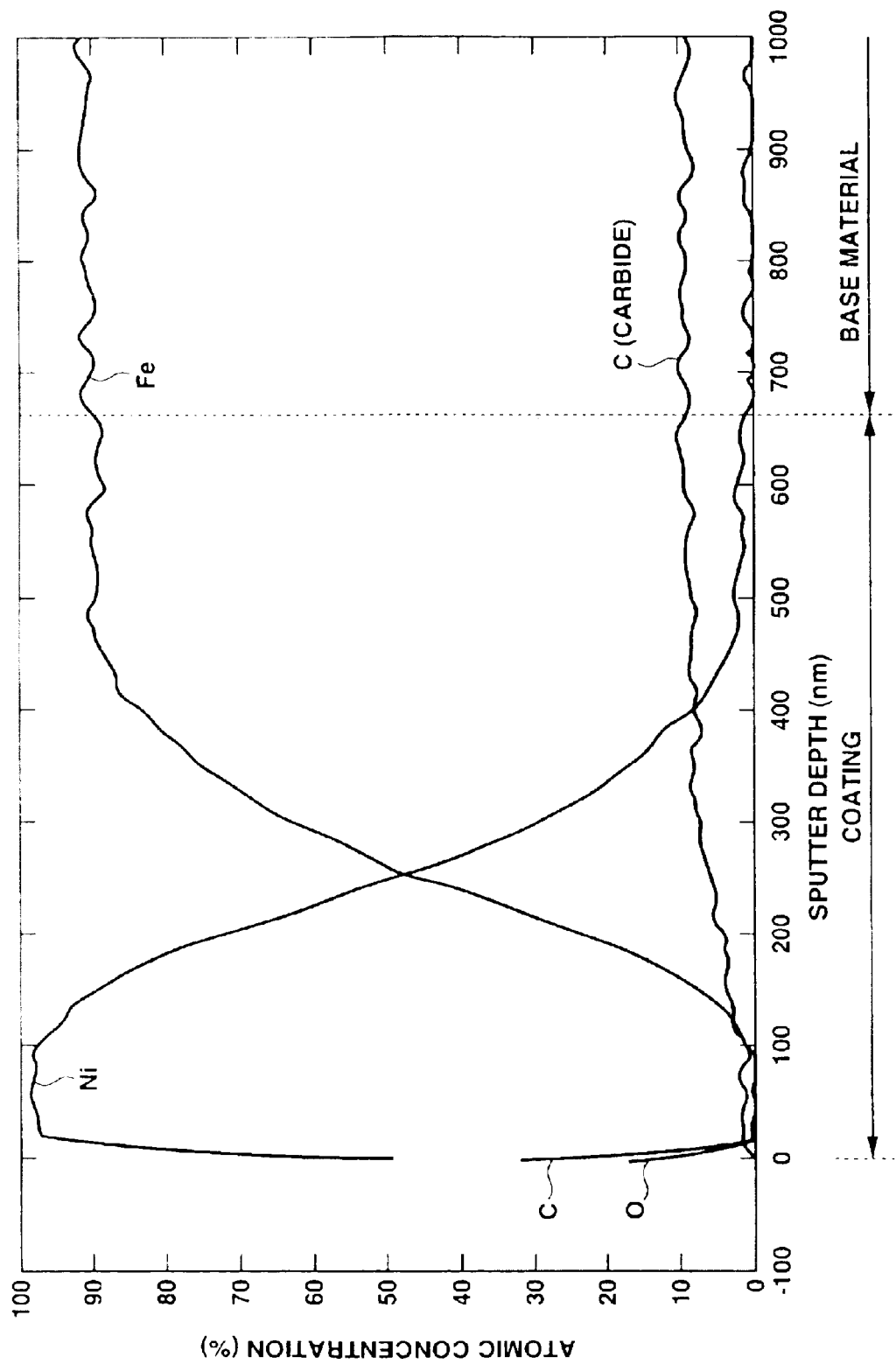

ROTARY MEMBER AND PRODUCTION PROCESS

BACKGROUND OF THE INVENTION

The present invention relates to a rotary member and its production process. For examples, the rotary member may be: a grease-sealed bearing used in alternator of motor vehicle, electromagnetic clutch, idler pulley and other accessory equipment for an engine; a rolling bearing used in fuel injector pump; a rolling bearing for supporting a torque transmitting member such as a gear in a multi speed transmission, and a rolling member in a continuously variable transmission; a rolling bearing used in a compressor of air conditioner; a rolling member such as discs and power rollers in continuously variable transmission; and a gear of any of various types used in motor vehicle. More specifically, the present invention relates to the structure and production process of a rotary member adapted to restrain short-life flaking like hydrogen embrittlement due to hydrogen penetrating into base material such as steel in the rotary member.

In recent years, there are demands for power trains of smaller size and lighter weight, to improve fuel efficiency and increase power. Accordingly, rotary members such as rolling bearings, gears, and the like used in various portions in a power train are required to bear severe conditons of heavy load and high rotational speed with the construction of smaller size and lighter weight.

In the case of a grease-sealed bearing for alternator or electromagnetic clutch, the bearing is operated in stringent environment of heavy load, high speed and strong vibration due to vibration of engine. As a result, the use for only short time could cause structure change of peculiar mode underneath the rolling surface, and the resulting flaking as reported in (D1) "A new Type of Microstructural Change in Bearings for Electrical Instruments and Auxiliary Devices of Automotive Engines" NTN Technical Review No. 61 (1992), (D1') "Brittle Flaking on Bearings for Electrical Instruments and Auxiliary Devices and Life Extension of these Bearings" NTN Technical Review No. 61 (1992), and (D2) "Study on Fatigue Mechanism of Bearings for Automotive Alternators", NSK Technical Journal No. 656 (1993).

The cause for this short-life flaking is thought to be that the use in the severe environment of heavy load, high speed rotation, and strong vibration causes mirror surface wearing in rolling contact surface, the formation of fresh metal surface caused by this wear plays a catalytic role to decompose grease, and the hydrogen thus generated intrudes into steel, which results in the hydrogen embrittlement like flaking.

In the case of a rolling bearing in a compressor of an air conditioner, the bearing is lubricated with a mixture of lubricant and refrigerant. For the protection of earth environment, a new refrigerant of a type including hydrofluorocarbon (HFC) is used as alternative to flon. With this replacement of the refrigerant, the lubricant is replaced, too, from the lubricant prepared from petroleum such as naphthene-type and paraffin-type, to lubricant soluble in HFC such as polyalkylene glycol (PAG) or polyolester (POE). As a result, a peculiar structure change could occur in the inside under the rolling contact surface and cause flaking before long, as recited in (D3) Tribologist, Vol. 37, No. 11 (1992), and (D4) Published Japanese Patent Application Kokai No. H08(1996)-177864.

This short-life flaking is probably caused by microsopic metal contact generated between a rolling element and a bearing ring under the new condition of film of the new refrigerant. Fresh metal surface bared by this metal contact acts to decompose hydrocarbon or water in the lubricant, and the resulting hydrogen intrudes into the metal and enbrittles the internal structure.

As measures against the above-described short-life hydrogen embrittlement like flaking, there have been proposed technique in which triiron tetroxide is formed on the rolling surface by blackening treartment or black oxide finishing (as proposed in (D5) Published Japanese Patent Application Kokai No. H02(1990)-190615≈U.S. Pat. No. 5,150,974); technique in which a lubricant containing a deactivator is used to reform the rolling surface so that the reaction of deactivator is accelerated (as proposed in (D6) Published Japanese Patent Application Kokai No. 2001-20958); and technique in which the content of Cr of base material is increased to form an inert oxide film such as $FeCrO_4$ on the surface (as proposed in (D4) Published Japanese Patent Application Kokai No. H08(1996)-177864).

SUMMARY OF THE INVENTION

In either case, it is thought that the hydrogen embrittlement like flaking in the rolling surface is caused by the process of (1) a first step in which hydrogen atoms or ions are generated by the decomposition of hydrocarbon or entering water → (2) a second step in which the generated hydrogen atoms or ions intrude into steel→(3) a third step in which the material is embrittled by the intruding hydrogen.

In these techniques, an inert oxide film is formed on a rolling surface, to restrain catalytic action, and thereby to reduce the amount of hydrogen generated the the decomposition reaction of hydrocarbon or water. Namely, these techniques are measures in the above-mentioned step (1). However, the catalytic action for the decomposition reaction of hydrocarbon is performed not only by the fresh metal surface but also by acid etc. yielded by the decomposition of entering water and additives. Therefore, the inert film is not complete for restraining the generation of hydrogen, depending on the lubrication environment, and not sufficient to prevent hydrogen from intruding into steel.

Addition of Al, Nb, N, etc. to steel is another example to improve the resistance of material against hydrogen embrittlement by decreasing the size of austenitic crystal grains (as disclosed in (D7) Published Japanese Patent Application Kokai No. H05(1993)-255809). This example is the measure treating the above-mentioned step (3). However, the structure of finer crystal grains increases the area ratio of crystal grain boundary serving as a hydrogen intruding passage, and thereby tends to increase the amount of hydrogen intruding into steel.

Therefore, it is realized that there are demands for rotary members that can restrain the hydrogen embrittlement like short-life flaking by improving the aforementioned hydrogen intruding step (2), which has not been improved by the conventional example, by restraining the intrusion of hydrogen into steel even if the amount of generated hydrogen is increased by changes in service environment or lubrication environment.

Specifically, the hydrogen embrittlement like short-life flaking can occur not only in grease-sealed bearings used in alternator of motor vehicle, electromagnetic clutch, idler pulley and other accessory equipment for an engine, and bearings used in a compressor of an air conditioner; but also in rolling members such as discs and power rollers in continuously variable transmissions, gears in transmissions, torque transmitting members and bearings in continuously variable transmissions, and rolling bearings used in fuel injector pumps, and other rotary members which are required to bear heavy load, higher rotating speed and strong vibrations, with smaller size and ligher weight.

It is therefore an object of the present invention to provide rotary members and production methods for the rotary members resistant to short-life flaking.

According to the present invention, a rotary member having a contact surface for contacting with a mating body in relative motion, with the aid of a lubricant, comprises: a base region of a ferrous base material; and a hydrogen blocking layer formed in the contact surface for contacting with the mating body in the relative motion. The hydrogen blocking layer includes a concentrated portion formed in the base region and made of a substance lower in hydrogen diffusion coefficient than the base material.

According to another aspect of the present invention, a process of producing a rotary member having a contact surface for contacting with a mating body in relative motion with lubrication, comprises: preparing a base region of a ferrous base material; forming a coating layer of a low hydrogen diffusion substance which is lower in hydrogen diffusion coefficient than the base material; and forming a concentrated portion by causing the low hydrogen diffusion substance of the coating layer to diffuse into the base material.

The other objects and features of this invention will become understood from the following description with reference to the accompanying drawings.

BRIEF DESCRIPTION OF THE DRAWINGS

FIG. 9 is a graph showing a profile of Ni concentration confirmed by Auger spectroscopy in a rotary member subjected to Ni plating.

DETAILED DESCRIPTION OF THE INVENTION

Figure 1:
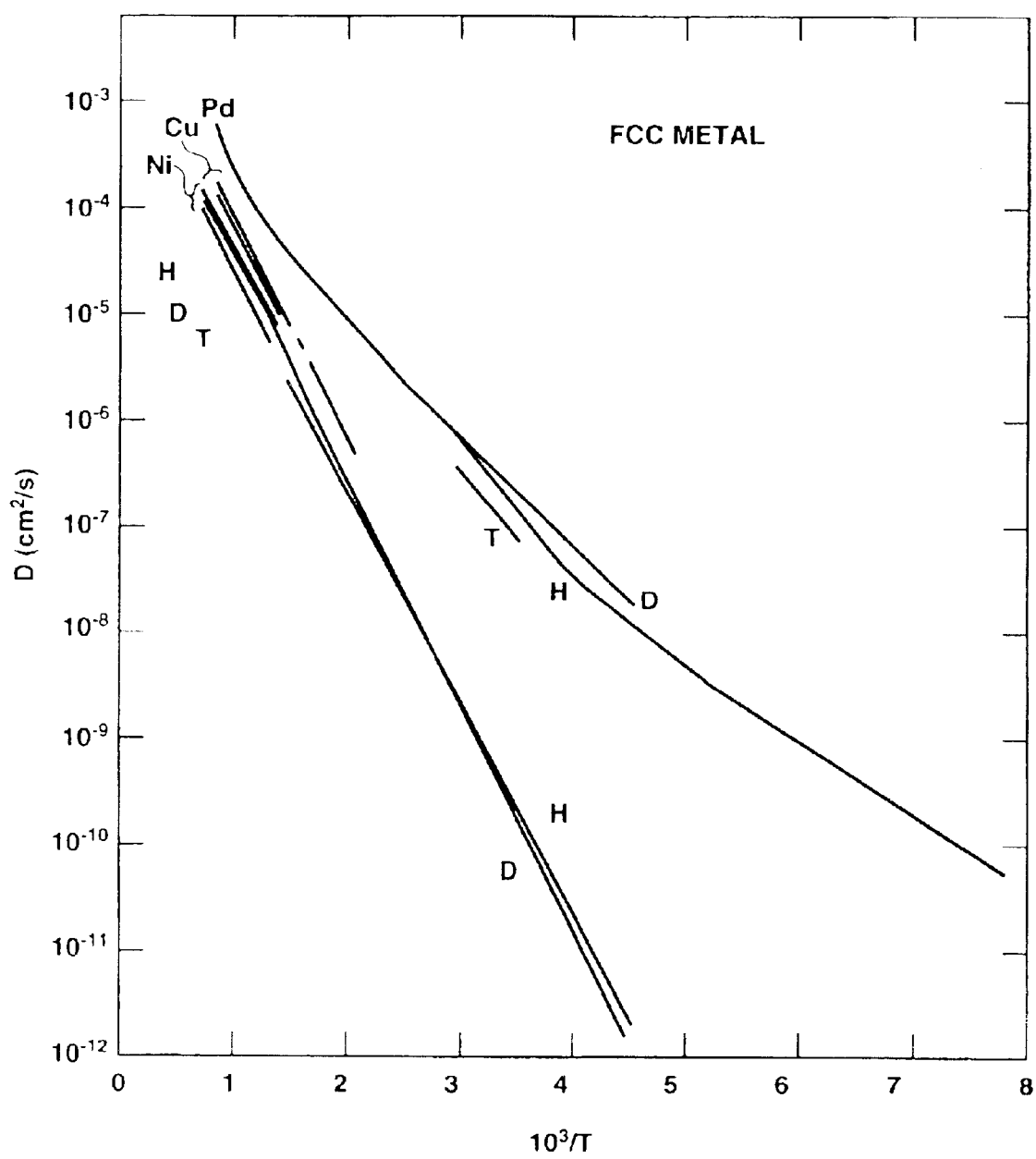
FIG. 1 is a graph showing measured values of the hydrogen diffusion coefficient of elements forming coating film and/or concentrated portion in practical examples according to one embodiment of the present invention.

In one embodiment of the present invention, a rotary member for contacting with a mating body in relative motion, with the aid of a lubricant such as oil or grease or other lubricant containing hydrocarbon, includes at least: a base region of a ferrous base material such as steel; and a hydrogen blocking layer (or hydrogen trap layer) formed in a contact surface. The hydrogen blocking layer includes at least a concentrated portion or layer of a substance (low hydrogen diffusion substance)(element and/or compound) lower in the hydrogen diffusion coefficient than the base material. In addition to the concentrated portion, the hydrogen blocking layer may include a coating layer or film containing, as main component, a substance (element and/or compound) lower in the hydrogen diffusion coefficient than the base material. The thus-formed hydrogen blocking layer functions to restrain the intrusion, into the base region of the ferrous base material such as steel, of hydrogen produced by the decomposition of hydrocarbon or water during the rolling or sliding movement.

The hydrogen blocking layer formed in the contact surface acts to retard the diffusion of hydrogen and trap hydrogen in the surface layer. Accordingly, this structure can retard the intrusion of hydrogen into the internal region exposed to higher stress, and reduce the amount per unit time, of hydrogen diffused into the inside. Even if a coating layer is removed by wearing or separation, the hydrogen blocking function of the concentrated portion or layer can continue stably for long. The concentrated portion in the form of a layer formed in the entirety of the contact surface is preferable. However, it is optional to form the concentrated portion only in a region or regions of the contact surface where the possibility of generation of hydrogen is high. For example, it is possible to achieve a sufficient hydrogen blocking function with a concentrated portion formed in a region near a terminal portion of a contact eclipse where the oil film tends to become thin and hydrogen tends to be produced.

The hydrogen diffusion coefficient D of the low hydrogen diffusion substance (element and/or compound) may be: $D \leq 10^{-5}$ (cm$^2$/s) at $10^3/T(K) \geq 2$. Preferably, $D \leq 10^{-6}$ (cm$^2$/s) at $10^3/T(K) \geq 2$. More desirably, $D \leq 10^{-8}$ (cm$^2$/s) at 300 (K).

In general, the diffusion coefficient of hydrogen in material increases with increase in temperature according to Arrhenius relationship $\{\exp(-Q/RT)\}$. As to gears, bearings and other rotary members in motor vehicles, the temperature in most cases is equal to or lower than about 200° C. even in the most stringent situations. In such a temperature region, the hydrogen diffusion coefficient in steel material is approximately in the range of $10^{-4} \sim 10^{-3}$ (cm$^2$/sec) at $10^3/$ T(K)=2~2.5, and in the range of in the range of $10^{-6}$~$10^{-4}$ (cm$^2$/sec) at $10^3$/T(K)=3.3 (300K).

In an embodiment according to the present invention, the hydrogen blocking layer is made of a substance having a significantly low hydrogen diffusion coefficient in the temperature range equal to or lower than about 200° C., as compared to the steel base material. With the hydrogen blocking layer, the hydrogen blocking or trapping effect is improved significantly.

Figure 2:
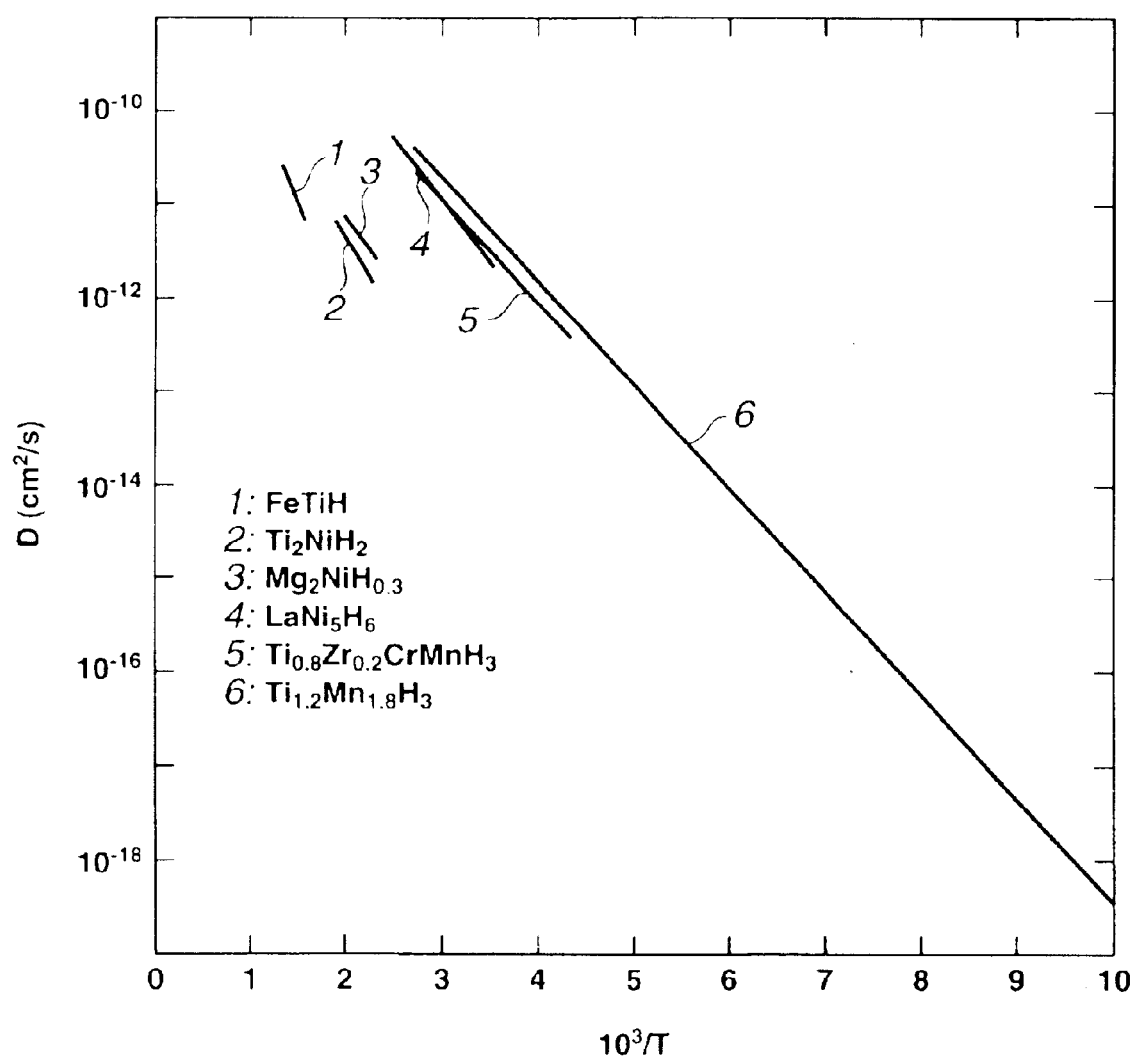
FIG. 2 is a graph showing measured values of the hydrogen diffusion coefficient of compounds forming a coating film and/or concentrated portion in practical examples according the embodiment the present invention.

Some examples of the low hydrogen diffusion substance are: elements such as Pd, Ni and Cu, and intermetallic compounds such as TiFeH, Ti2NiH2, Mg2NiH0.3, and LaNi5H6. However, the present invention is not limited to these substances. FIGS. 1 and 2 show measurement examples of the hydrogen diffusion coefficient of various substances.

In the embodiment of the present invention, the low hydrogen diffusion substance is a substance having a face-centered cubic (fcc) structure. According to the current knowledge, the diffusion of hydrogen or motion of hydrogen atoms is said to be due to the quantum mechanical tunnel effect. A fcc metal is larger in spacing between adjacent positions in the lattice structure as compared to steel (of bcc or bct structure), so that a particle can pass only through a vibration excitation level near a potential peak, and hence the hydrogen diffusion coefficient becomes lower in the case of the fcc metal as compared to the bcc metal. Specifically, Ni and Cu are preferable fcc metals having low hydrogen diffusion coefficients.

The hydrogen blocking layer can be formed, for example, by plating to form a coating layer. It is optional to employ other fcc elements such as Pd, or steel material containing a large amount of retained austenite having a fcc structure.

The concentrated portion having a thickness (or depth) equal to or greater than 50 nm can provide a sufficient effect of blocking intrusion of hydrogen into the base region, like a coating film, and maintain the superior hydrogen blocking performance of the concentrated portion for a long time. The concentrated portion having a thickness (or depth) equal to or greater than 100 nm is preferable for maintaining the hydrogen blocking function for a longer time. Moreover, it is preferable to set the maximum concentration of the low hydrogen diffusion substance (element or compound) equal to or higher than 5 at % in the concentrated portion.

In a production method according to the embodiment of the present invention, for producing a rotary member used under the condition of lubrication with a lubricant such as oil, grease or a mixture of a refrigerant such as hydrofluorocarbon (HFC) and a lubricant soluble in the refrigerant, a base region of a ferrous base material is prepared, and thereafter a concentrated portion is formed for example by forming a coating layer of a low hydrogen diffusion substance which is lower in hydrogen diffusion coefficient than the base material and by causing the low hydrogen diffusion substance of the coating layer to diffuse into the base material. In this case, the low hydrogen diffusion substance of the coating layer is the same as that of the concentrated layer. The concentrated layer can be formed by causing the low hydrogen diffusion substance of the coating layer to diffuse into the base material by a running-in operation of putting the rotary member in frictional contact with a mating body.

The concentrated portion may be formed by ion implantation. However, this method tends to increase the manufacturing cost. One of methods advantageous in cost is the method of forming a coating film or layer on a base region by relatively easy surface treatment such as electroplating, and forming a concentrated portion by a running-in operation or a normal operation in an assembled state to enable the substance of the coating layer to penetrate and diffuse into the base material of the base region by repetition of pressure application and heating. By utilizing the diffusion of the low hydrogen diffusion substance into the base material, it is possible to form the hydrogen trap concentrated layer or the combination of a coating layer and a concentrated portion easily.

PRACTICAL EXAMPLES

Practical Examples (PE) of a rotating member will now be described, and the usefulness thereof will be shown in comparison with comparative examples (CE). In the examples, measured values for the rotating member were obtained by the following methods.

[Measuring Method for Film Thickness]

For the thickness of a film (or coating film or layer) in a prepared specimen, the cross section of a film forming portion (portion including the film) was quantified by observation using a SEM (Scanning Electron Microscope).

[Measuring Method for Phosphorus Content In Film]

The phosphorus content in a film (or coating film or layer) of the prepared specimen was quantified by using a commercially-available fluorescent X-ray spectrometer. Measurement was carried out for a plurality of samples having different phosphorus contents which were known. From the strength of each sample, an intensity-content calibration curve was prepared. The rotating member was cut into an appropriate size under the same condition, and measurement was made. The measured intensity was converted into phosphorus content in accordance with the aforementioned calibration curve.

[Measuring Method for Concentrated Layer]

The thickness or depth of a concentrated layer (Conc) in a sample was quantified by measurement of depth profile from a contact surface by using an Auger spectroscopy (SAM4300 produced by PHI).

[Hydrogen Diffusion Coefficient of Element Forming a Coating Film]

Use was made of values measured by Fukai et al. (FIGS. 1 and 2) and recited in "The Metal-Hydrogen Systems-Basic Bulk Properties, Springer (1993)", Bulletin of Japan Institute of Metals 24 (1985).

Next, a manufacturing method for the rotating member according to the embodiment of the present invention will be described. Advantages of the embodiment were evaluated by using as a member for contacting with a mating member in rolling contact, or a member (bearing, for example) for contacting with a mating member in rolling contact with slight sliding motion relative to the mating member, a thrust ball bearing shown in FIG. 3, a deep groove ball bearing shown in FIG. 4, for supporing a rotation shaft of an automobile alternator, and a thrust ball bearing shown in FIG. 5, and by using, as a member (such as gear) for contacting with a mating member in sliding contact, small and large rollers shown in FIGS. 6A and 6B.

Figure 3:
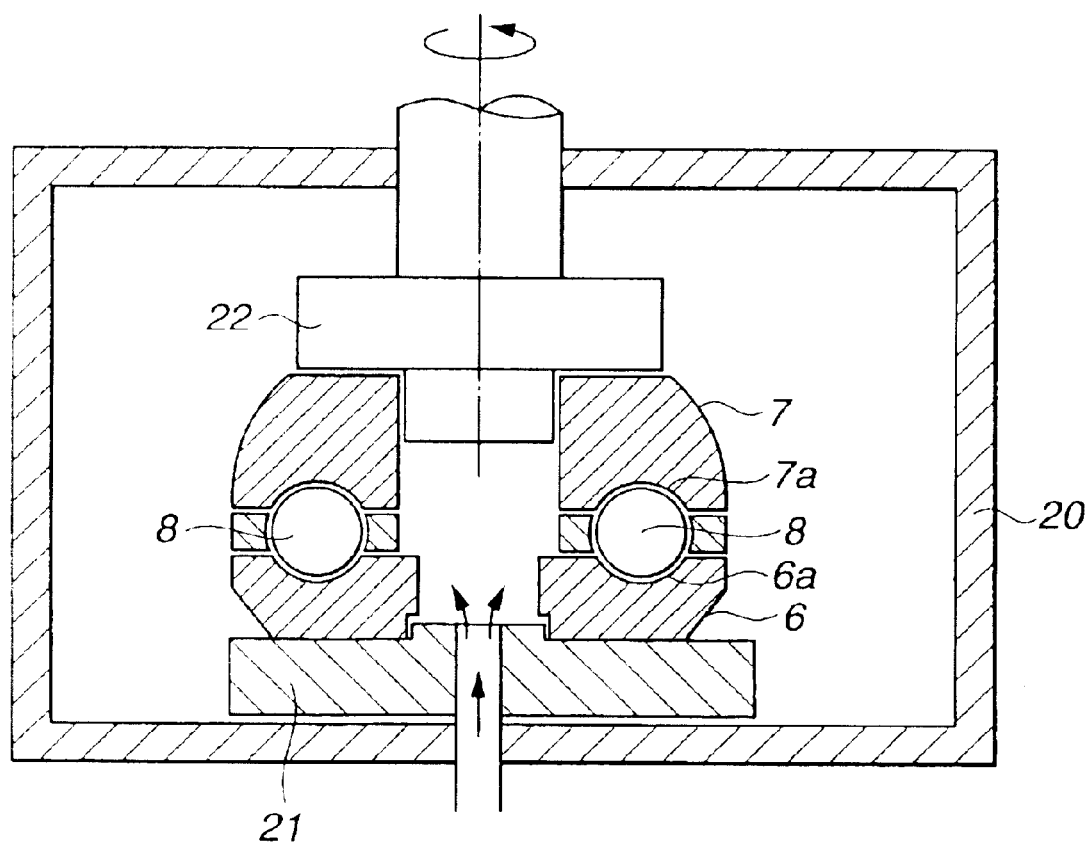
FIG. 3 is a sectional view for illustrating rolling fatigue test of a thrust roller bearing employed in the embodiment of the present invention.
Figure 6A:
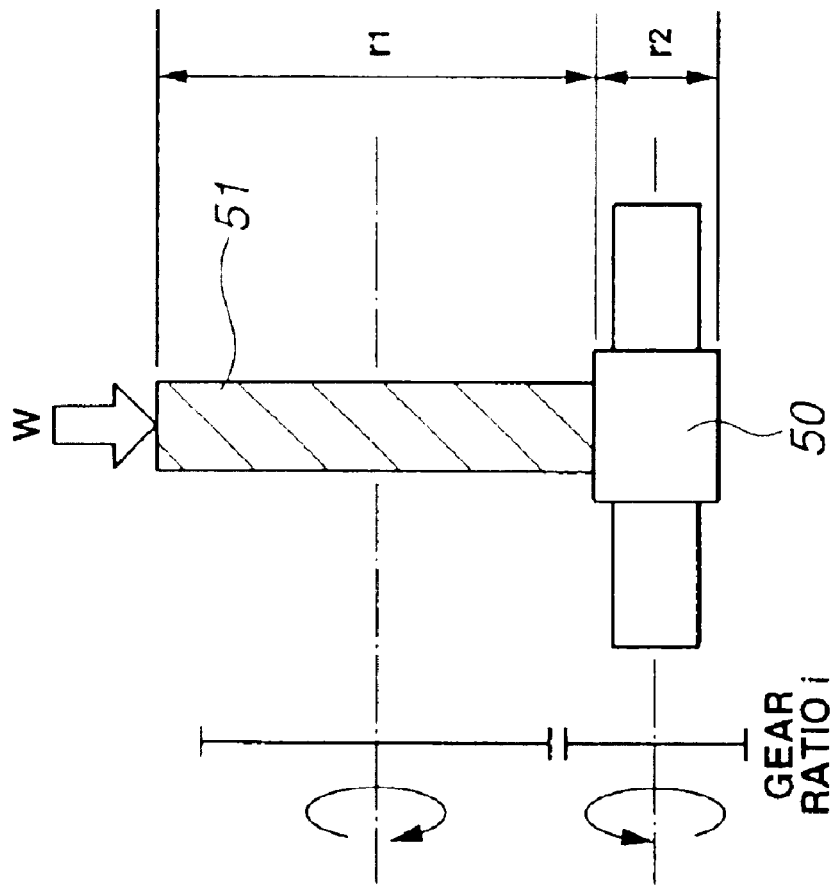
FIGS. 6A and 6B show, in side view and front elevation, roller pitching test for small roller and large roller employed in the embodiment of the present invention. The front elevation is taken from the axial direction.
Figure 6B:
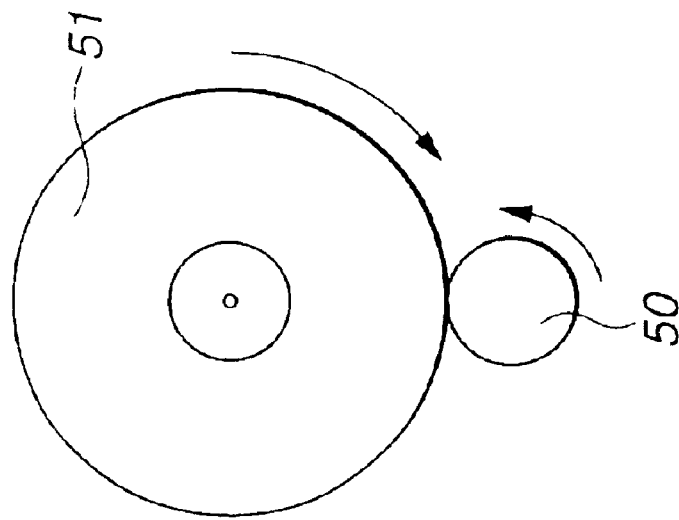
Figure 7:
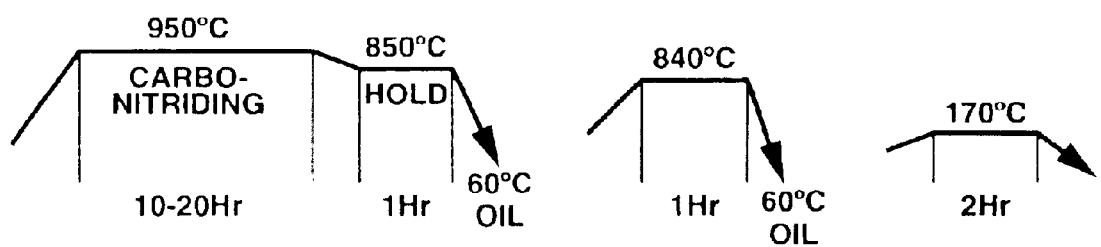
FIG. 7 is a view for illustrating conditions of heat treatment for carbonitriding quenching employed in the embodiment of the present invention.

As to inner and outer rings of the thrust ball bearing shown in FIG. 3, and small and large rollers shown in FIGS. 6A and 6B, raw material having a composition shown in Table 1 was shaped by forging roughly into a desired shape, and thereafter carbonitriding quenching was performed under the condition of heat treatment shown in FIG. 7.

TABLE 1

| C | Si | Mn | Cr | Mo | P | S |
|---|----|----|----|----|---|---|
| 0.2 | 0.25 | 0.8 | 1.1 | 0.15 | 0.015 | 0.009 |

Then, grinding or grinding super finishing was performed to a rolling contact portion (contact surface). As to the thrust ball bearing of FIG. 3, the bearing groove was completed so that the surface hardness is HV700~HV720, and the surface roughness is about Ra0.03. As to the small and large rollers of FIGS. 6A and 6B, the rolling contact portion was completed so that the surface hardness is HV700~HV720, and the surface roughness is about Ra0.2. As to the deep groove ball bearing of FIG. 4 and the thrust ball bearing of FIG. 5, a commercially available bearing of bearing steel SUJ2 was used.

Then, various coatings (Films) and concentrated layers (abbreviated to Conc in tables) were formed under the following conditions to the above-mentioned bearings and test pieces.

[Conditions for Forming a Coating Film Containing, as Main Component, Nickel (Ni)]
1) Base material on which a coating film is formed: Race surface of rolling bearing, and small and large rollers.
2) Composition of plating bath:

| A. Strike plating bath (Ni based) | |
|---|---|
| Nickel chloride | 200 g/L |
| Hydrochloric acid | 80 g/L |
| Boric acid | 30 g/L |
| pH | 1 or less |
| Plating bath temperature | 50~55° C. |
| Current density | 0.1~10 A/dm² |
| B. Electroplating bath (Ni based) | |
| 60% sulfamic acid Nickel (aqueous solution) | 800 g/L |
| Nickel chloride | 15 g/L |
| Boric acid | 45 g/L |
| Saccharin soda | 5 g/L |
| 50% hypophosphorous acid (aqueous solution) | 0 or 1 g/L |
| pH | 4~5 |
| Plating bath temperature | 55~60° C. |
| Current density | 1~10 A/dm² |
| C. Electroless plating bath (Ni based) | |
| Nickel chloride | 16 g/L |
| Sodium hypophosphite | 24 g/L |
| Sodium succinate | 16 g/L |
| Malic acid | 18 g/L |
| Diethylamine | 10 g/L |
| pH | 5~6 |
| Plating bath temperature | 90~95° C. |

[Conditions for Forming a Coating Film Containing as a Main Component Copper (Cu)]

| D. Electroplating bath (Cu based) | |
|---|---|
| Cuprous cyanide | 60 g/L |
| Sodium cyanide | 75 g/L |
| Sodium carbonate | 30 g/L |
| PH | 12~13 |
| Plating bath temperature | 50~60° C. |
| Current density | 2~5 A/dm² |

| E. Electroless plating bath (Cu based) | |
|---|---|
| Copper sulfate | 10 g/L |
| Rochelle salt | 50 g/L |
| Sodium hydroxide | 10 g/L |
| Formalin (37%) (aqueous solution) | 10 g/L |
| Stabilizer | very small amount |
| pH | 11~13 |
| Plating bath temperature | Room temperature |

[Conditions for Forming a Coating Film Containing as a Main Component Palladium (Pd)]

| F. Electroplating bath (Pd based) | |
|---|---|
| Palladium sodium chloride | 5 g/L |
| Sodium nitrite | 15 g/L |
| Sodium chloride | 35 g/L |
| PH | 5~7 |
| Plating bath temperature | 40~45° C. |
| Current density | 0.5~1 A/dm² |

[Conditions for Forming Ni Concentrated Layer]
1) Base material on which a coating film is formed: Thrust ball bearing, race surfaces of inner and outer rings of deep groove ball bearing, and small and large rollers.
2) Composition of plating bath: Use was made of baths identical to the before-mentioned Ni strike plating bath (A), electroplating bath (B), and electroless plating bath (C).
3) Conditions for running-in: In this embodiment, a concentrated layer (Conc) was formed by running-in opereation (Run-In) after simplified forming of a coating film.
a) Thust ball bearing: Under the condition of forced lubrication of traction oil, a running-in operation for 1~10 hours was performed at a surface pressure (or bearing pressure) of 2~3 GPa.
b) Deep groove ball bearing: Under the condition of grease lubrication, a running-in operation for 1~10 hours was performed at an axila load of about 1kN.
c) Thrust roller bearing: In a clean oil bath, a running-in operation for 1~10 hours was performed at a load of about 3 kN.
d) Small roller: Under the condition of forced lubrication of traction oil, a running-in operation for 1~10 hours was performed at a surface pressure of 1~2 GPa.

Practical Example 1 (PE1) and Practical Example 3 (PE3)

After strike plating (abbreviated to Strike in Tables) including Ni as a main component was performed by using the bath of (A), to bearing grooves in inner and outer rings of a rolling bearing, a coating film including Ni as a main component was formed by electroplating using the bath of (B). As the plating bath (B) used in forming the coating film containing as a main component, Ni by the electroplating method, the practical example 3 (PE3) employed a bath to which 1 g/L of 50% hypophosphorous acid was added, and the practical example 1 (PE1) employed a plating bath to which 50% hypophosphorous acid was not added.

Practical Example 2 (PE2)

After strike plating including Ni as a main component was performed by using the bath of (A), to bearing grooves in inner and outer rings of a rolling bearing, a coating film including Ni as a main component was formed by electroless plating using the bath of (C).

Practical Example 4 (PE4) and Practical Example 5 (PE5)

After strike plating including Ni as a main component was performed by using the bath of (A), to bearing grooves in inner and outer rings of a rolling bearing, a coating film including Ni as a main component was formed by electroplating using the bath of (B). Thereafter, a Ni concentrated layer was formed in a base material surface layer by performing a running-in operation under the above-mentioned conditions. As to Practical Example 4 (PE4), to the surface to which the running-in operation was performed, Ni coating was formed successively by srike plating (with the bath of (A)) and electroplating (with the bath of (B)).

Practical Example 6 (PE6) and Practical Example (PE7)

A coating film containing Cu as main component was formed on a race surface of a rolling bearing, by electroplating (with the bath of (D)). In Practical Example 7 (PE7), a running-in operation was performed under the abovementioned conditions after the Cu plating, and Cu plating was performed again after the running-in operation.

Practical Example 8 (PE)

A coating film containing Pd as a main component was formed on a race surface of a rolling bearing by electroplating with the bath of (F).

Comparative Example 1 (CE1)

A sample not subjected to plating was prepared.

Comparative Example 2 (CE2)

Surface treatment (treatment with iron oxide) as mentioned in (D5) Published Japanese Patent Application Kokai No. H02(1990)-190615 (≈U.S. Pat. No. 5,150,974).

Practical Example 9 (PE9)

After strike plating including Ni as a main component was performed with the bath of (A), to an outer ring portion of a deep groove ball bearing, a coating film containing Ni as main component was formed by electroplating (with the bath of (B)).

Practical Example 10 (PE10)

After strike plating including Ni as a main component was performed with the bath of (A), to an outer ring portion of a deep groove ball bearing, a coating film containing Ni as main component was formed by electroplating (with the bath of (B)). Thereafter, a Ni concentrated layer was formed in a base material surface layer by performing a running-in operation under the above-mentioned conditions. To the surface subjected to the running-in operation, a Ni coating film was formed successively by Ni srike plating (with the bath of (A)) and electroplating (with the bath of (B)).

Practical Example 11 (PE11)

After strike plating including Ni as a main component was performed with the bath of (A), to an outer ring portion of a deep groove ball bearing, a coating film containing Ni as main component was formed by electroplating (with the bath of (B)). Thereafter, a Ni concentrated layer was formed in a base material surface layer by performing a running-in operation under the above-mentioned conditions.

Practical Example 12 (PE12)

To an outer ring portion of a deep groove ball bearing, a coating film containing Cu as main component was formed by electroplating (with the bath of (D)).

Comparative Example 3 (CE3)

A deep groove ball bearing not subjected to plating was prepared.

Practical Example 13 (PE13)

After strike plating including Ni as a main component was performed with the bath of (A), to a roller rolling surface of a thrust roller bearing, a coating layer containing Ni as main component was formed by electroplating (with the bath of (B)).

Practical Example 14 (PE14)

After strike plating including Ni as a main component was performed with the bath of (A), to a roller rolling surface of a thrust roller bearing, a coating film containing Ni as main component was formed by electroplating (with the bath of (B)). Thereafter, a Ni concentrated layer was formed on a base material surface layer by performing a running-in operation under the above-mentioned conditions.

Practical Example 15 (PE15)

An electroplating coating film incluidng Cu as a main component was formed on a roller rolling surface of a thrust roller bearing, by electroplating (with the bath of (D)).

Practical Example 16 (PE16)

An electroplating coating film including Cu as a main component was formed on a roller rolling surface of a thrust roller bearing, by electroplating (with the bath of (D)). Thereafter, a Cu concentrated layer was formed in a base material surface layer by performing a running-in operation under the above-mentioned conditions.

Comparative Example 4 (CE4)

A thrust roller bearing not subjected to plating to a rolling surface was prepared.

Practical Example 17 (PE17)

After strike plating including Ni as a main component was performed with the bath of (A), to a roller rolling surface of a thrust roller bearing, a coating film containing Ni as main component was formed by electroplating (with the bath of (B)). After the formation of this Ni electroplating coating film, a baking operation of 130° C.×20 hours was performed in a vacuum furnace.

Practical Example 18 (PE18)

After strike plating including Ni as a main component was performed with the bath of (A), to a roller rolling surface of a thrust roller bearing, a coating film containing Ni as main component was formed by electroplating (with the bath of (B)). Thereafter, a Ni concentrated layer was formed in a base material surface layer by performing a running-in operation under the above-mentioned conditions.

Practical Example 19 (PE19)

An electroplating coating film including Cu as a main component was formed on a roller rolling surface of a thrust roller bearing, by electroplating (with the bath of (D)).

Comparative Example 5 (CE5)

Another thrust roller bearing not subjected to plating to a rolling surface was prepared.

Practical Example 20 (PE20)

After strike plating including Ni as a main component was performed with the bath of (A), to a small roller, a coating film containing Ni as main component was formed by electroplating (with the bath of (B)).

Practical Example 2 (PE21)

After strike plating including Ni as a main component was performed with the bath of (A), to a small roller as in Practical Example 20, a coating film containing Ni as main component was formed by electroplating (with the bath of (B)). Thereafter, a running-in operation was performed under the above-mentioned conditions, to the small roller formed with this Ni coating film. After the running-in operation, to the surface subjected to the running-in operation, a coating film containing Ni as main component was formed successively by Ni srike plating (with the bath of (A)) and electroplating (with the bath of (B)). In this way, a Ni concentrated layer was formed in the sliding surface of the small roller.

Practical Example 22 (PE22)

A coating film containing Cu as a main component was formed to small and large rollers, by electroplating (with the bath of (D)).

Comparative Example 6 (CE6)

A small roller not subjected to electroplating was prepared.

Next, a method for evaluating the rotary members of the practical examples and comparative examples will be described.

(I) Thrust ball bearing (simulating T-CVT: Practical Examples 1~8, Comparative Examples 1 and 2) A rolling fatigue life test was performed for race surfaces of inner and outer rings (bearing groove) by using a bearing rolling fatigue testing machine as shown in FIG. 3. The testing machine shown in FIG. 3 includes a casing 20 in which a bearing having balls 8 between an inner ring 7 and an outer ring 6 is placed. The testing machine further includes a plate 21 for holding the lower surface of outer ring 6, and a rotating shaft 22 for abutting on the upper surface of inner ring 7 with a predetermined pressing force. While a lubricating oil is supplied to the inside of inner ring 7 through plate 21, inner ring 7 is rotated with rotating shaft 22.

Traction oil was used for lubrication, and test conditions were so set that a maximum contact surface pressure became equal to 3.6 GPa under forced lubrication of 3 L/min. A rolling fatigue life was detected with a vibration sensor, and the test time was measured until the condition of flaking was reached by a bearing groove portion 7a or 6a of inner or outer ring 7 or 6. The thus-measured test time up to the condition of flaking was taken as a duration of life.

Table 2 (placed at the end of Detailed Description of the Invention) shows results of the rolling fatigue life test carried out under the above-mentioned conditions for Practical Examples (PE) 1~8, and Comparative Examples (CE) 1 and 2, together with values of properties of coating films (Film) and concentrated layers (Conc layer) of bearing groove portions before testing, and methods for forming the films and concentrated layers. Table 3 shows results obtained by cutting out rolling portions from samples having different structure change patterns in bearing groove portion after the rolling fatigue test, which was subjected to the rolling fatigue test, and by measuring the quantity of diffusible hydrogen in steel.

TABLE 3

| Bearing groove portion | Amount of diffusible hydrogen (ppm) |
|---|---|
| New product | 0.7 |
| Long-life product | 1.2 |
| Short-life product | 4.1 |

Figure 4:
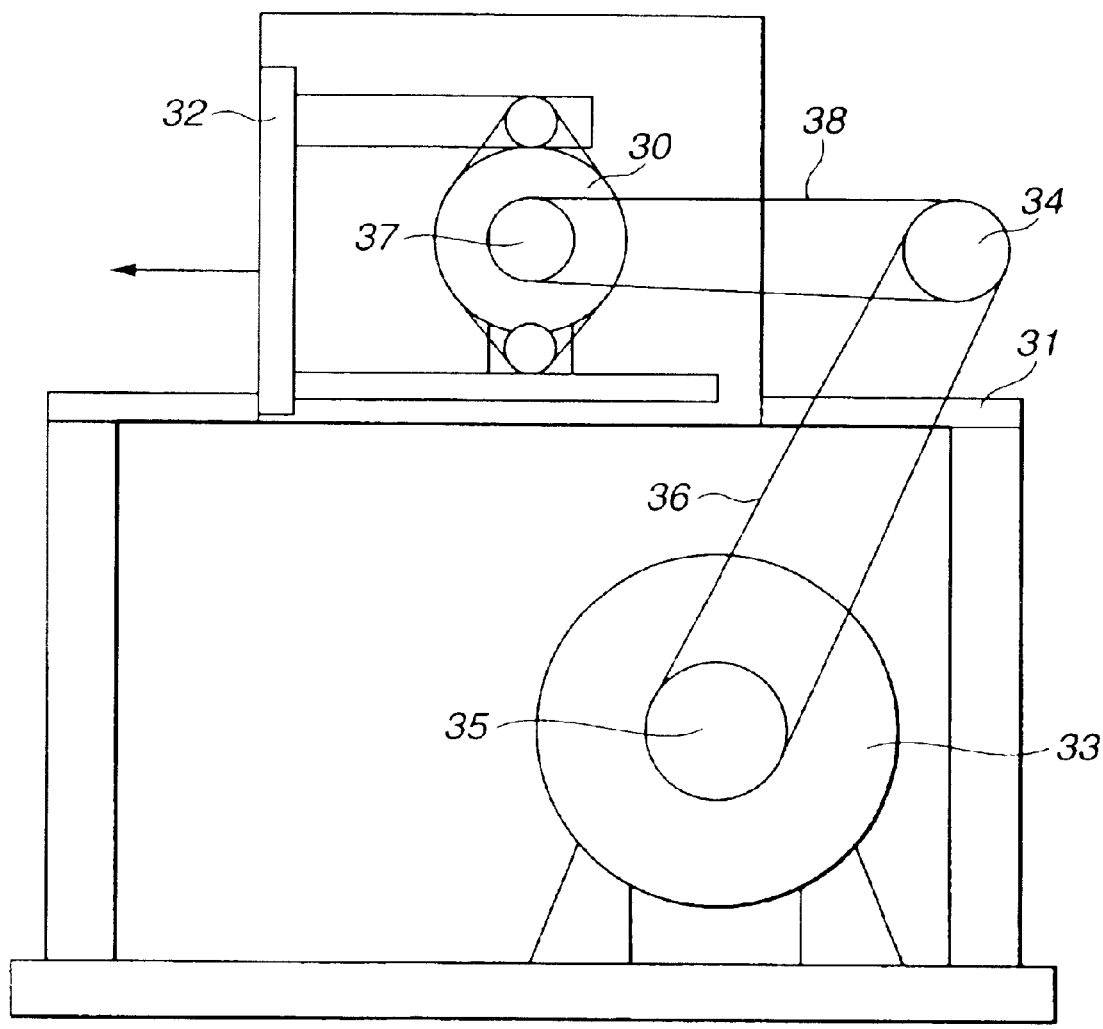
FIG. 4 is a side view for illustrating bench rapid acceleration/deceleration test for a deep groove ball bearing employed in the embodiment of the present invention.

(II) Deep groove ball bearing (simulating engine accessory/alternator, idler pulley, and bearing for air conditioner electromagnetic clutch: Practical Examples (PE) 9~12, Comparative Example (CE) 3) A rapid acceleration/deceleration (up-down cyclic revolution) test was conducted by using a bench rapid acceleration/deceleration (up-down) testing machine as shown in FIG. 4, and an actual alternator for automobile using a deep groove ball bearing (6303 type) for supporting a rotating shaft. The bench rapid acceleration/deceleration testing machine of FIG. 4 includes a holder 32 movable in a horizontal direction on a base 31, a drive motor 33 disposed under base 31, and an intermediate pulley 34 disposed on base 31. Holder 32 is arranged to support an alternator 30. An output pulley 35 of drive motor 33 is connected with intermediate pulley 34 by a first belt 36, and intermediate pulley 34 is connected with an input pulley 37 of alternator 30 by a second belt 38. Alternator 30 is driven by drive motor 33 through first and second belts 36 and 38 and intermediate pulley 34. The load to a rotating portion of alternator 30 can be varied by shifting holder 32 in the horizontal direction and varying the tension of second belt 38.

The axial load was set equal to about 1.8 kN, and the revolution speed of input pulley 37 was changed for several seconds repeatedly in a pattern of 2000 rpm →14000 rpm →2000 rpm. A rolling fatigue life was detected with a vibration sensor, and the test time was measured until the occurrence of flaking in the bearing groove portion of the inner or outer ring of a front side bearing. The thus-measured test time was used as a duration of life.

Table 4 (placed at the end of Detailed Description of the Invention) shows results of the rolling fatigue life test carried out under the above-mentioned conditions for Practical Examples (PE) 9~12, and Comparative Example (CE) 3, together with values of properties of coating layers and concentrated layers of deep groove ball bearings (6303) before testing, and methods for forming the films and concentrated layers. (In Table 4, DEC stands for Dark Etching Constituent.) Table 5 shows results obtained by cutting out rolling portions from samples having different structure change patterns of deep groove ball bearings after the rolling fatigue test, which was subjected to the rolling fatigue test, and by measuring the quantity of diffusible hydrogen in steel.

TABLE 5

| Outer ring | Amount of diffusible hydrogen (ppm) |
| --- | --- |
| New product | 0.7 |
| Long-life product | 1.1 |
| Short-life product | 3.1 |

Figure 5:
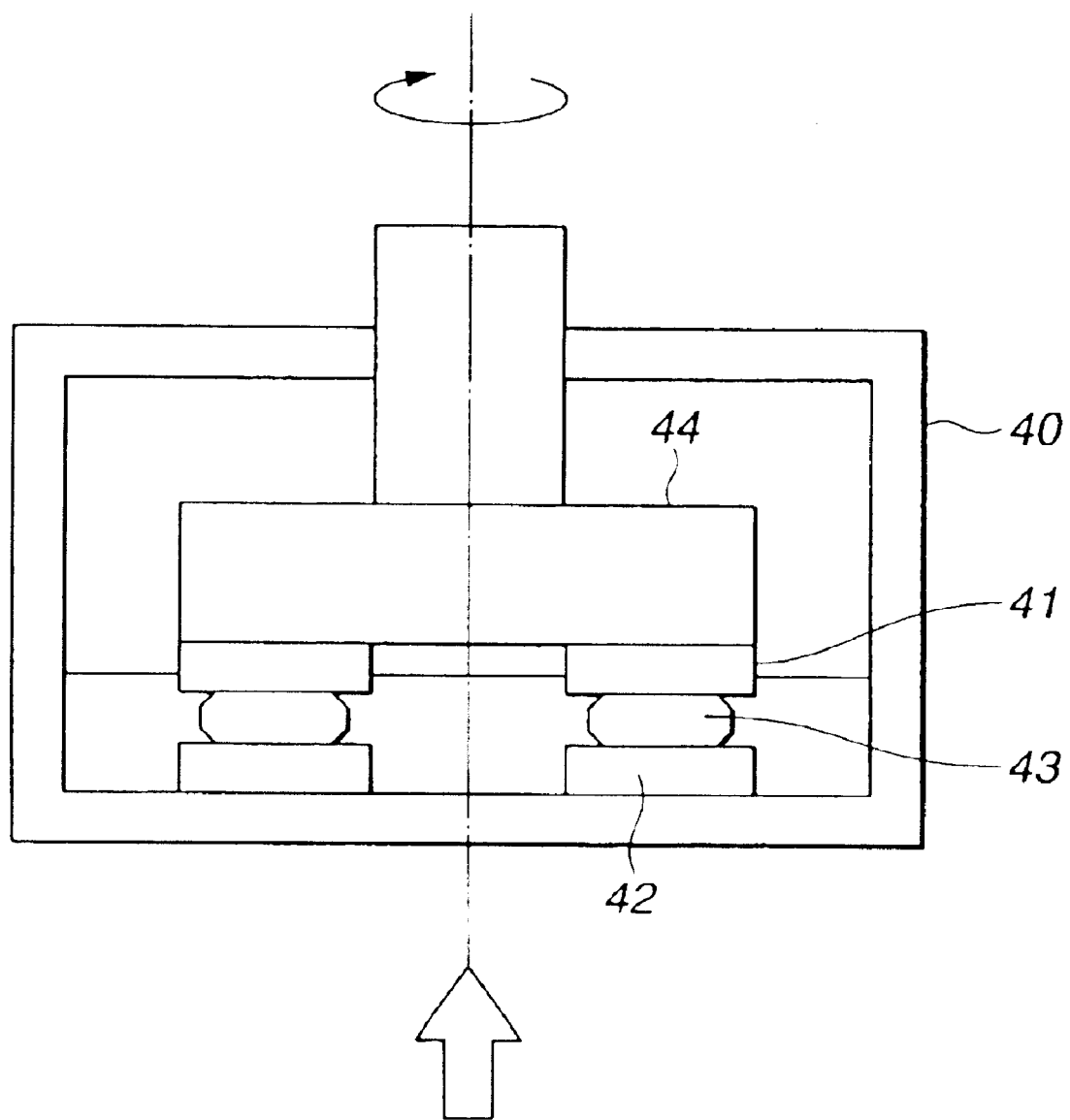
FIG. 5 is a sectional view for illustrating a thrust test of a thrust roller bearing employed in the embodiment of the present invention.

(III) Thrust roller bearing (assuming a roller bearing for a fuel pump: Practical Examples (PE) 13~16, Comparative Example (CE) 4): A rolling test was conducted by using a thrust testing machine as shown in FIG. 5 for a roller bearing (FNTA-2542C produced by NSK). The testing machine of FIG. 5 includes a casing 40 for receiving a bearing including a plurality of needle rollers interposed between an inner ring 41 and an outer ring 42. An inside bottom of casing 40 supports the lower side of outer ring 42, and a rotating shaft 44 presses the upper surface of inner ring 41 with a predetermined pressing force. A lubricating oil is supplied into casing 40. Inner ring 41 is rotated together with rotating shaft 44.

A rolling test was conducted by preparing a lubricating oil containing a water content of about 1000 ppm by adding water to engine oil, and supplying the lubricating oil into casing 40. A rolling fatigue life was detected with a vibration sensor, and a test time until flaking of a rolling member (roller) was used as a life.

Table 6 (at the end of Detailed Description of the Invention) shows results of the rolling fatigue life test carried out under the above-mentioned conditions for Practical Examples (PE) 13~16, and Comparative Example (CE) 4, together with values of properties of coating layers and concentrated layers of thrust roller bearing before testing, and methods for forming the films and layers. Table 7 shows results obtained by cutting out rolling portions from samples having different structure change patterns of thrust roller bearings after the rolling fatigue test, which was subjected to the rolling fatigue test, and by measuring the quantity of diffusible hydrogen in steel.

TABLE 7

| Roller | Amount of diffusible hydrogen (ppm) |
| --- | --- |
| New product | 0.4 |
| Long-life product | 0.9 |
| Short-life product | 2.1 |

(IV) Thrust roller bearing (assuming a bearing in an air conditioner compressor: Practical Examples (PE) 17~19, Comparative Example (CE) 5): As to a roller bearing shown in FIG. 5 (FNTA-2542C produced by NSK), by using a thrust testing machine and by preparing a lubricating liquid mixture by mixing 97% of white kerosene and 3% of polyalkylene glycol (PAG) serving as a lubricant with reference to (D4) Published Japanese Patent Application Kokai No. H08-177864, a rolling test was conducted in this lubricating liquid mixture. A rolling fatigue life was detected with a vibration sensor, and a test time until flaking of a rolling member (roller) was used as a life.

Table 8 (at the end of Detailed Description of the Invention) shows results of the rolling fatigue life test carried out under the above-mentioned conditions for Practical Examples (PE) 17~19, and Comparative Example (CE) 5, together with values of properties of coating films and concentrated layers of thrust roller bearing before testing, and methods for forming the films and layers. Table 9 shows results obtained by cutting out rolling portions from samples having different structure change patterns of thrust roller bearings after the rolling fatigue test, which has been subjected to the rolling fatigue test, and by measuring the quantity of diffusible hydrogen in steel.

TABLE 9

| Roller | Amount of diffusible hydrogen (ppm) |
| --- | --- |
| New product | 0.4 |
| Long-life product | 0.6 |

(V) Roller pitching test (simulating a gear: Practical Examples (PE) 20~22, Comparative Example (CE) 6): As to a small roller 50 and a large roller 51 shown in FIG. 6, a rolling fatigue life test of small roller was conducted by using a roller pitching test machine shown in FIG. 4. This test was for evaluating the rolling fatigue life of a rotating member, such as a gear, which is used in the condition of a rolling contact with slide of a relatively large extent.

Traction oil was used for lubrication, and test conditions were so set that a maximum contact bearing pressure became equal to 3.0 GPa under forced lubrication of 2 L/min, and a relative slip rate was 60% with a gear provided in the test machine. A rolling fatigue life was detected with a vibration sensor, and the test time until the condition of flaking was reached by small roller 50 or large roller 51 was taken as a duration of life.

Table 10 (at the end of Detailed Description of the Invention) shows results of the rolling fatigue life test carried out under the above-mentioned conditions for Practical Examples (PE) 20~22, and Comparative Example (CE) 6 together with values of properties of coating films and concentrated layers of thrust roller bearing before testing, and methods for forming the films and layers.

Figure 8A:
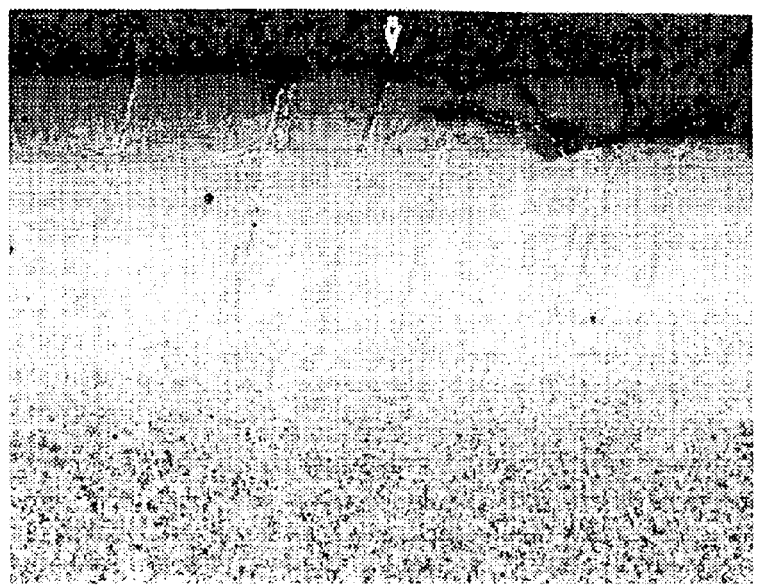
FIGS. 8A and 8B are photographs showing microstructures of two different types in section in the rolling direction near a flaking portion in a thrust ball bearing.
Figure 8B:
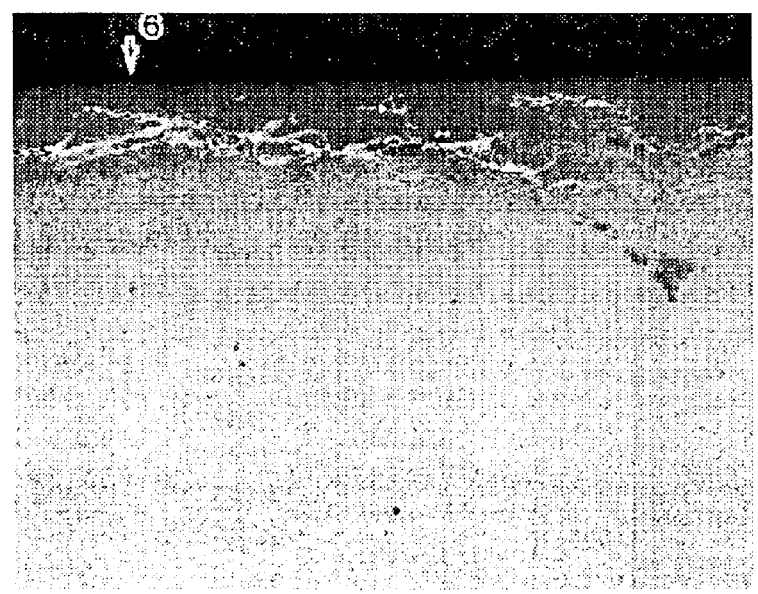

FIGS. 8A and 8B are photographs of cross-sectional microstructure in the rolling direction near a flaking portion of a thrust ball bearing. FIGS. 8A and 8B show two different white structures. Under the test conditions using the thrust ball bearing, all the samples suffering flaking showed an A-type structure change shown in FIG. 8A or a B-type structure change shown in FIG. 8B near a flaking portion. The A-type structure change was observed in relatively long life samples whereas the B-type structure change was observed in relatively short life samples. Tables 2, 4, 6, 8 and 10 show the type of structure change together with the results of rolling fatigue testing.

Table 11 shows results obtained by cutting out rolling portions from samples having different structure change patterns after the rolling fatigue test and by measuring the quantity of diffusible hydrogen in steel. The measurement was made by using a thermal description gas analyzer (UPM-ST-200R manufactured by ULVAC), and the quantity of hydrogen released at a heating temperature of 400° C. or lower was taken as the quantity of diffusible hydrogen.

TABLE 11

| Structure change | Amount of diffusible hydrogen (ppm) | Life |
| --- | --- | --- |
| A-Type | 1.8 | Long |
| B-Type | 4.1 | Short |

As evident from Table 11, the amount of penetrating hydrogen is greater in the B-type reaching flaking with a shorter life than in the A-type. Accordingly, it can be considered that the B-type structure change is a mode of flaking like hydrogen embrittlement due to penetrating hydrogen. Accordingly, it is possible to prolong the life by restraining the penetration of hydrogen to shift the structure pattern from the B-type to the A-type.

Table 2 confirms that samples of the examples provided with a hydrogen blocking (or shutoff) surface layer according to the present invention show the A-type structure change under the genuine rolling conditions only with very small sliding motion, as the result of the rolling fatigue life test to the bearing groove portion, and hence the samples of the examples according to the present invention are significantly improved in rolling fatigue life as compared to the comparative examples.

Figure 10:
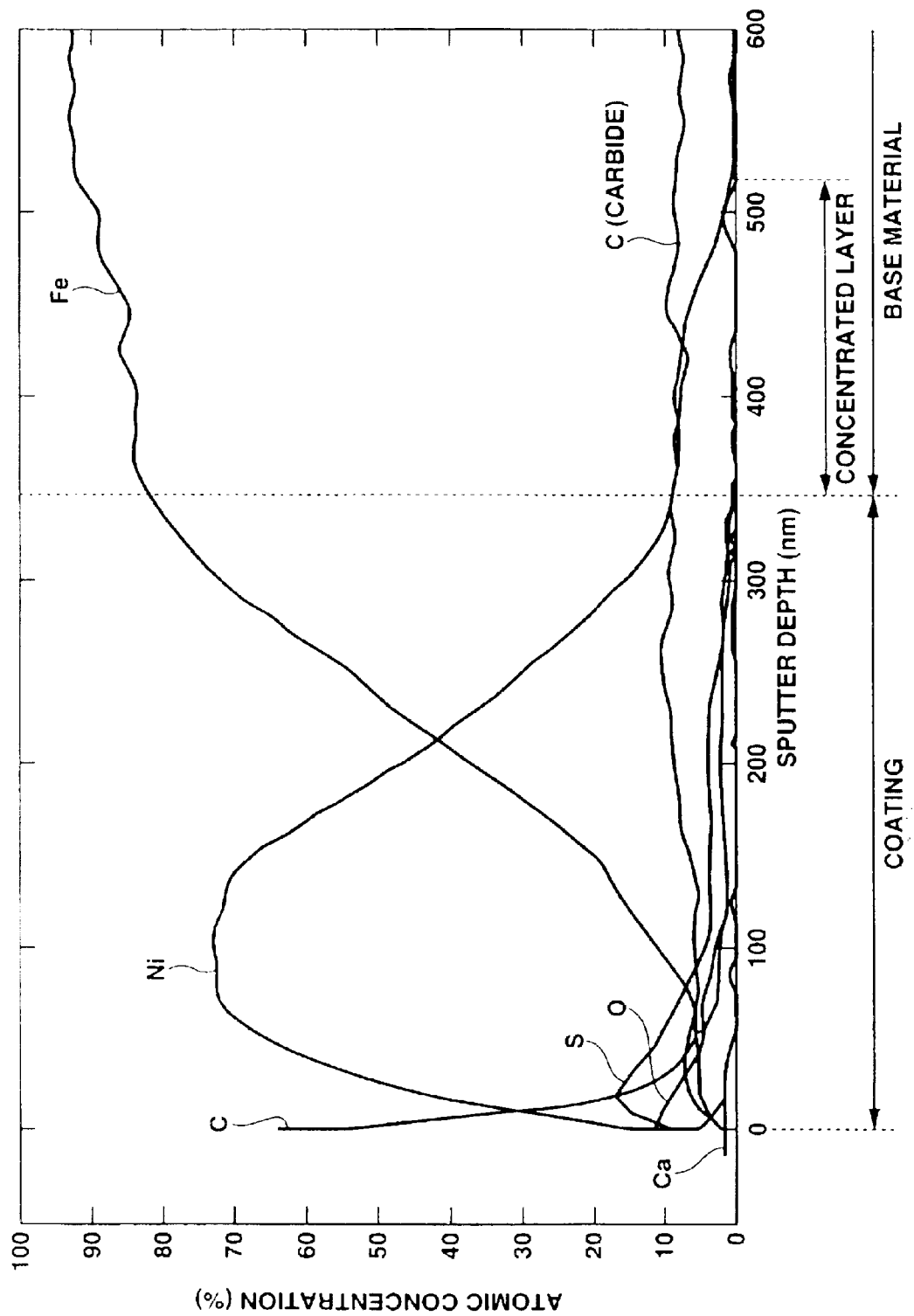
FIG. 10 is a graph showing a profile of Ni concentration confirmed by Auger spectroscopy in a rotary member subjected to Ni plating and running-in operation.
Figure 11A:
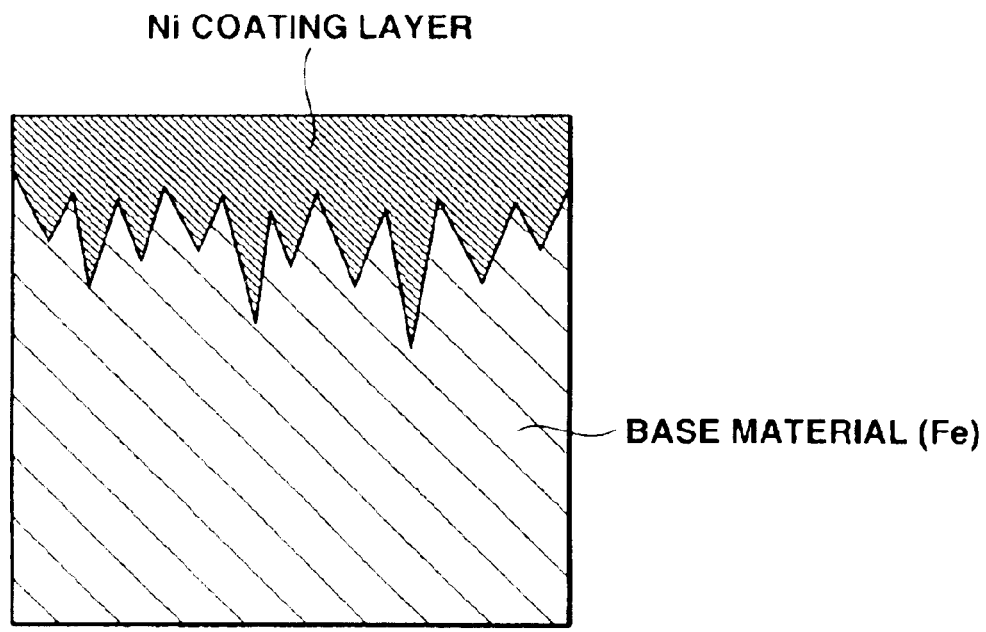
FIG. 11A is a schematic sectional view illustrating the structure of a sample in the case of FIG. 9.
Figure 11B:
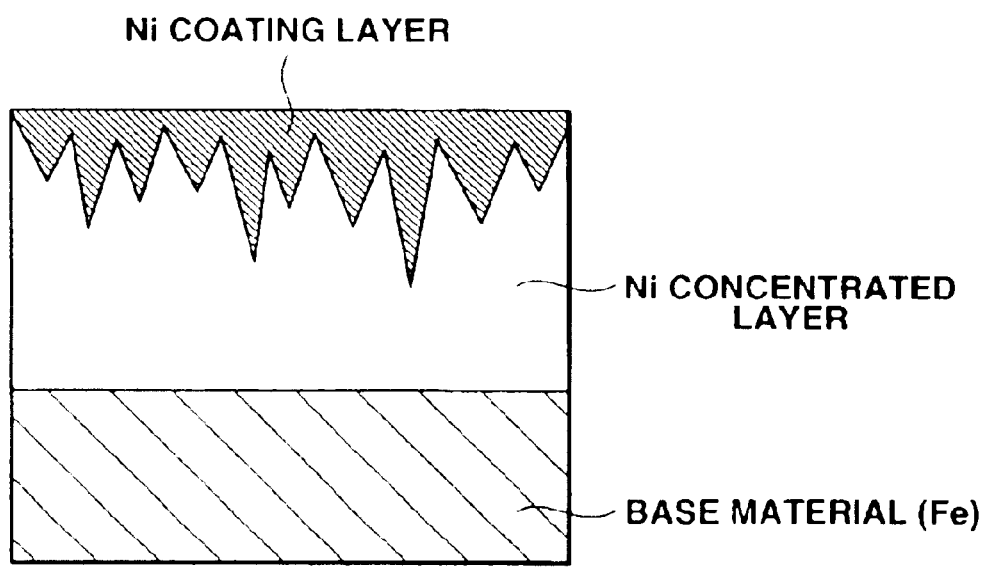
FIG. 11B is a schematic sectional view illustrating the structure of a sample of FIG. 10.

FIGS. 9 and 10 show the results of observation of Ni concentrated layer with an Auger electron spectroscope for samples formed with Ni coating film and samples subjected to running-in operation after Ni electroplating. FIGS. 9 and 10 show the results of measurement of depth profile of element in the depth direction observed during the process of sputtering from the rolling surface, with the Auger electron spectroscope (SAM4300 by PHI). FIGS. 11A and 11B schematically show Ni coating film and Ni concentrated layer in the base region, respectively, for examples of FIG. 9 and FIG. 10. The rolling surface of a base material has minute ruggedness as schematically shown in FIGS. 11A and 11B, due to the roughness of the finishing operation. The Ni coating is filled in recessed portions of the ruggedness. Therefore, the Ni concentration decreases in the depth direction as shown in FIGS. 9 and 10 in accordance with the ratio between the area of the recessed portions (of Ni coating material) and the area of the projected portions (of the base material) of the ruggedness. In the case of FIG. 10, there is formed a Ni concentrated region of a higher Ni concentration shaped like a shelf or terrace having a relatively flat top extending in the depth direction, as shown in FIG. 10. This shelf-like Ni concentrated portion is formed in the deep position deeper than the bottoms of the recessed portions of the ruggedness. In this example, the shelf-like concentrated portion or layer has a thickness or depth equal to or greater than 100 nm, and the concentration of the low hydrogen diffusion substance is equal to or higher than 5 at % in the shelf-like concentrated portion. In this way, Ni of the coating film penetrates and diffuses into the base material, and thereby forms the Ni concentrated layer deep in the base region, as shown in FIG. 11B. A boundary between the coating (or electroplating) layer and the base material was determined by taking, into consideration, various factors obtained by the observation with sectional SEM observation and the surface roughness of the base material before electroplating. FIG. 10 shows the existence of concentrated layer in the sample subjected to running-in operation whereas no or little concentrated layer was observed in samples treated only with Ni electroplating. In the example of FIG. 9 and FIG. 11A subjected only to the Ni electroplating, there is formed no or little Ni concentrated layer. By contrast, the example of FIGS. 10 and 11B subjected to the running-in operation shows the Ni concentrated layer.

Even in the samples (such as Practical Examples 1 and 2) treated only with Ni electroplating, Ni concentrated layer was observed in the analysis of rolling surface after test conducted under the above-mentioned endurance test conditions. Therefore, it is proved that a concentrated layer can be formed by a normal operation without performing a special running-in operation. By the synergistic effect of Ni coating layer and Ni concentrated layer, moreover, it is considered possible to further prolong the life by promoting the formation of a concentrated layer by electroplating treatments before and after a running-in operation or by a combination of a running-in operation plus electroplating treatment.

In these practical examples, a concentrated layer is formed by a running-in operation after the formation of a coating film layer. Instead, it is possible to form a concentrated layer by roller burnishing or direct ion implantation.

Figure 12:
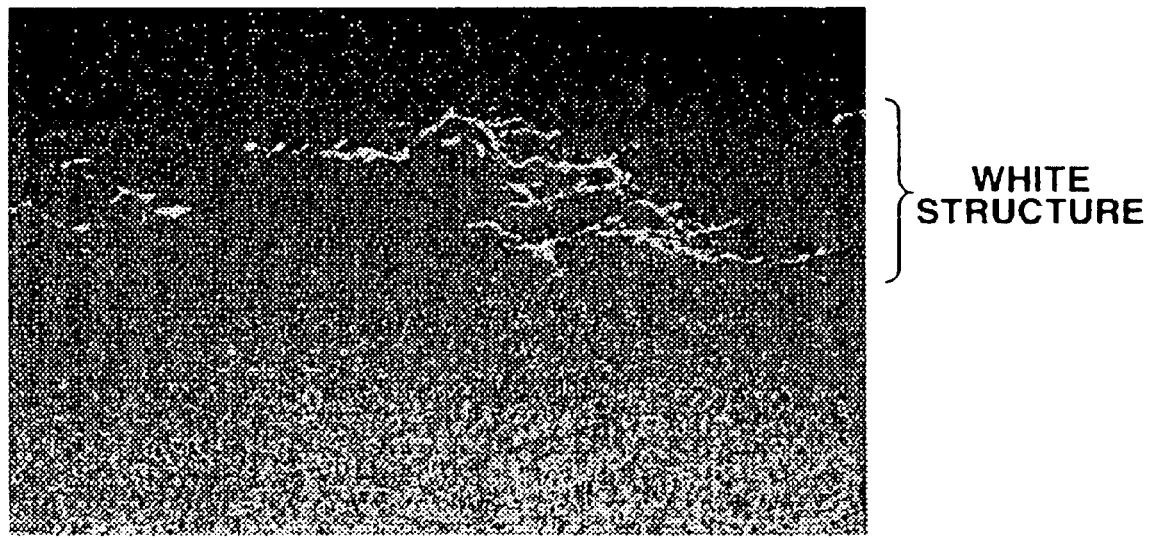
FIG. 12 is a photograph showing a sectional structure (with white structure) near a flaking portion of a rotary member.
Figure 13:
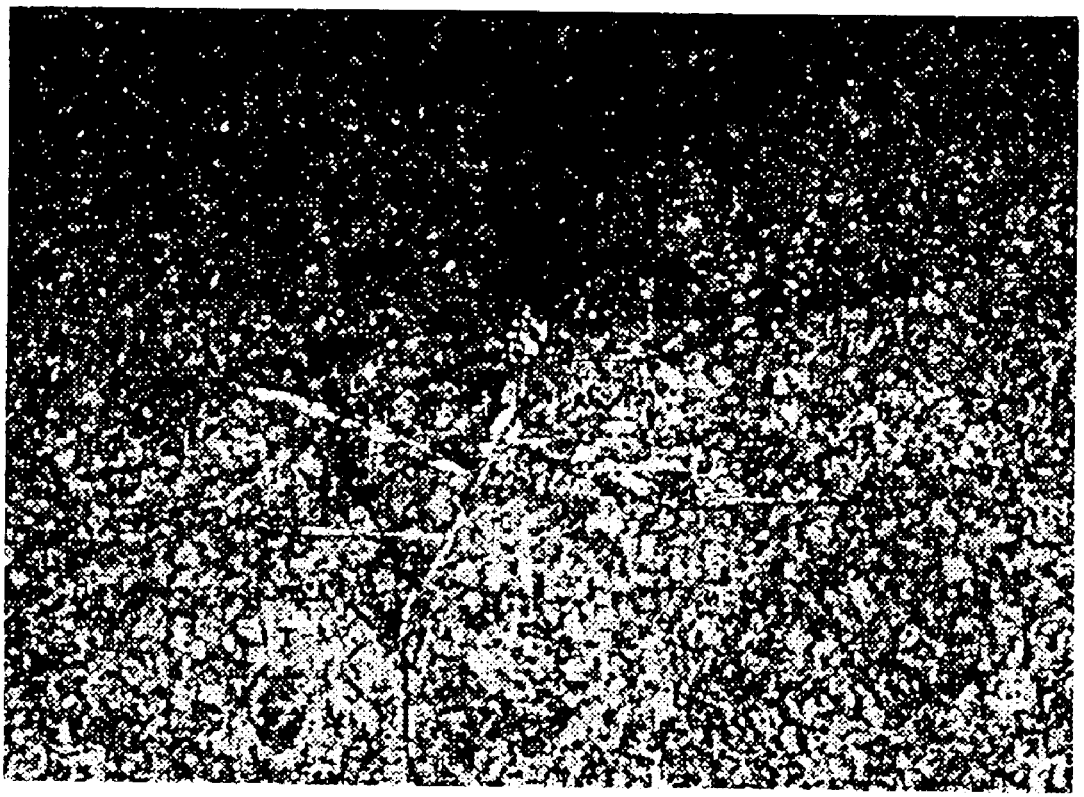
FIG. 13 is a photograph showing a sectional structure (with white structure) near a flaking portion of a rotary member.
Figure 14:
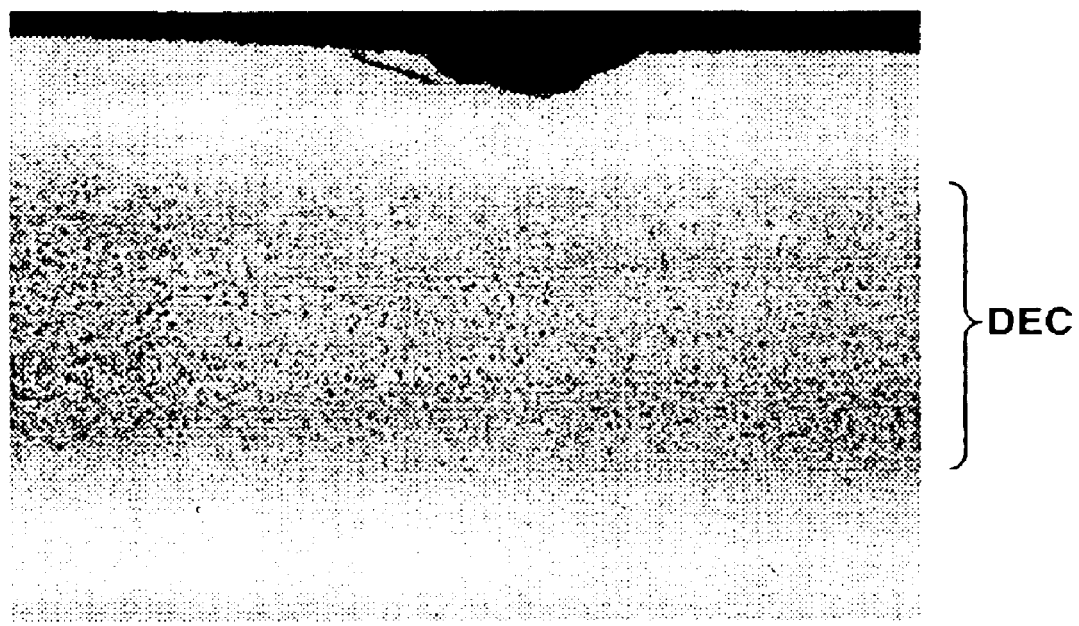
FIG. 14 is a photograph showing a sectional structure (without white structure) near a flaking portion of a rotary member.

As to each rolling member (rotation member) shown in Tables 4, 6 and 8, as in Table 2, the short-life samples show distorted white structure (B-type/hydrogen embrittlement type breakage mode). As an example, FIG. 12 shows a distorted white structure in a cross sectional structure near a flaking portion in the case of Tables 4 and 6, and FIG. 13 shows a cross sectional structure near a flaking portion in the case of Table 8. As shown in Tables 5, 7 and 9, however, the practical examples according to the present invention restrain the hydrogen penetration significantly and thereby provide the results of long life by preventing the flaking of B-type and causing the shift to the DEC type or a state having no structure change. FIG. 14 shows, as one example, a structure of the DEC type. The present invention is also applicable to bearings used in a transmission and is effective in the same manner.

The breakage mode in the case of small and large rollers under the test conditions as shown in Table 10 was different from the mode in the case of the test of a bearing as a single unit, and the long-life samples showed no white structure change in the rolling portion. On the other hand, the short-life samples showed irregular white structure (of B-type) similar to the structure shown in FIG. 8B. From the results of the above-mentioned bearing test machine, it is assumed that short-life flaking accompanied by B-type structure change in the roller pitching test machine is flaking of hydrogen embrittlement type due to penetrating hydrogen.

Furthermore, it is confirmed that, under the rolling contact condition with slide motion of large extent, the hydrogen blocking (or insulating) layer according to the present invention can prevent an undesired change in the internal structure, and improves the rolling fatigue life significantly as compared to the comparative examples. Like the roller bearing, a Ni or Cu concentrated layer was formed in the surface after running-in operation or endurance.

This application is based on a prior Japanese Patent Application No. 2001-360946. The entire contents of the prior Japanese Patent Application No. 2001-360946 with a filing date of Nov. 27, 2001 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

TABLE 2

| | SPEC | Forming Method | Before-test Film Thickness (μm) | Conc Layer (Before Test) | Conc Layer (After Test) | Life (cycles) | Damage Mode |
|---|---|---|---|---|---|---|---|
| PE1 | Ni Film | Ni Strike + Electroplating | 4 | — | 120 nm | 2.30E+08 | A |
| PE2 | Ni Film | Ni Strike + Electroless | 5 | — | 80 nm | 1.67E+08 | |
| PE3 | Ni + P Film | Ni Strike + Ni—P Electroplating | 5 | — | 90 nm | 1.93E+08 | A |
| PE4 | Ni Film + Conc Layer | (Ni Strike + Ni Electroplating) + Run-in + (Ni Strike + Ni Electroplating) | 5 | 40 nm | 200 nm | 3.77E+08 | A |
| PE5 | Ni Film + Conc Layer | (Ni Strike + Ni Electroplating) + Run-in | 0.5 | 60 nm | 90 nm | 2.15E+08 | A |
| PE5-1 | Ni Film + Conc Layer | (Ni Strike + Ni Electroplating) + Run-in | 0.06 | 60 nm | 80 nm | 2.30E+08 | A |
| PE5-2 | Ni Film + Conc Layer | (Ni Strike + Ni Electroplating) + Run-in | <0.02 | 110 nm | 150 nm | 1.98E+08 | A |
| PE6 | Cu Film | Cu Electroplating | 4 | — | 30 nm | 1.46E+08 | A |
| PE7 | Cu Film | (Cu Electroplating) + (Run-in) + (Cu Electroplating) | 4 | 30 nm | 100 nm | 1.64E+08 | A |
| PE8 | Pd Film | Pd Electroplating | 2 | — | 30 nm | 9.40E+07 | A |
| CE 1 | No Film | None | — | — | — | 4.05E+07 | B |
| CE 2 | Triiron Tetroxide Film | Iron Oxide Treatment | 2 | — | — | 4.86E+07 | B |

TABLE 4

| | SPEC | Forming Method | Before-test Film Thickness (μm) | Conc Layer (Before Test) | Conc Layer (After Test) | Life (Hr) | Structure Change |
|---|---|---|---|---|---|---|---|
| PE9 | Ni Film | Ni Strike + Ni Electroplating | 4 | — | 70 nm | 1050 | DEC |
| PE10 | Ni Film + Conc Layer | (Ni Strike + Ni Electroplating) + (Run-in) + (Ni Strike + Ni Electroplating) | 4 | 30 nm | 140 nm | 1455 | DEC |
| PE11 | Ni Film + Conc Layer | (Ni Strike + Ni Electroplating) + Run-in | 1 | 30 nm | 90 nm | 1157 | DEC |
| PE12 | Cu Film | Cu Electroplating | 5 | — | 30 nm | 654 | DEC |
| CE3 | No Film | None | — | — | — | 178 | B Type |

TABLE 6

| | SPEC | Forming Method | Before-test Film Thickness (μm) | Conc Layer (Before Test) | Conc Layer (After Test) | L50 Life (rev) | Structure Change |
|---|---|---|---|---|---|---|---|
| PE13 | Ni Film | Ni Strike + Ni Electroplating | 5 | — | 60 nm | 2.71E+07 | DEC |
| PE14 | Ni Film + Conc Layer | (Ni Strike + Ni Electroplating) + Run-in | 1.5 | 20 nm | 70 nm | 4.26E+07 | DEC |
| PE15 | Cu Film | Cu Electroplating | 4 | — | 80 nm | 1.43E+07 | DEC |
| PE16 | Cu Film + Conc Layer | (Cu Electroplating) + Run-In | 0.5 | 30 nm | 70 nm | 1.81E+07 | DEC |
| CE4 | No Film | None | — | — | — | 3.06E+06 | B Type |

TABLE 8

| SPEC | | Forming Method | Before-test Film Thickness ($\mu m$) | Conc Layer (Before Test) | Conc Layer (After Test) | L50 life (rev) | Hydrogen Embrittlement |
|---|---|---|---|---|---|---|---|
| PE17 | Ni Film | Ni Strike + Ni Electroplating + Baking | 5 | — | 30 nm | 1.14E+07 | None |
| PE18 | Ni Film + Conc Layer | (Ni Strike + Ni Electroplating) + Run-In | 1.5 | 20 nm | 50 nm | 1.47E+07 | None |
| PE19 | Cu Film | Cu Electroplating | 0.5 | — | 10 nm | 3.48E+06 | None |
| CE5 | No Film | None | — | — | — | 1.20E+06 | B Type |

TABLE 10

| SPEC | | Forming Method | Before-test Film Thickness ($\mu m$) | Conc Layer (Before Test) | Conc Layer (After Test) | Life | Structure Change |
|---|---|---|---|---|---|---|---|
| PE20 | Ni Film | Ni Strike + Ni Electroplating | 5 | — | 40 nm | 9.5E+06 | No Change |
| PE21 | Ni Film + Conc Layer | (Ni Strike + Ni Electroplating) + (Run-In) +(Ni Strike + Ni Electroplating) | 15 | 150 nm | 160 nm | 3.3E+07 | No Change |
| PE22 | Cu Film | Cu Electroplating | 10 | — | 30 nm | 7.8E+06 | No Change |
| CE6 | No Film | None | — | — | — | 1.5E+06 | B Type |

What is claimed is:

1. A rotary member having a contact surface for contacting with a mating body in relative motion, with the aid of a lubricant, the rotary member comprising:

a base region of a ferrous base material; and a hydrogen blocking layer formed in the contact surface for contacting with the mating body in the relative motion, the hydrogen blocking layer including a concentrated portion formed in the base region and made of a substance lower in hydrogen diffusion coefficient than the base material;

wherein the concentrated portion is in the form of a layer having a thickness greater than or equal to 50 nm.

2. The rotary member as claimed in claim 1, wherein the hydrogen blocking layer forms the contact surface for contacting with the mating body under the condition of lubrication, the ferrous base material is steel, the substance which is lower in the hydrogen diffusion coefficient than the base material is an element or a compound, and the lubricant includes at least one of oil, grease and a mixture of a refrigerant and a lubricant soluble in the refrigerant.

3. The rotary member as claimed in claim 1, wherein the hydrogen blocking layer comprises a coating layer containing, as main component, a substance which is lower in hydrogen diffusion coefficient than the base material, the coating layer being formed in the contact surface.

4. The rotary member as claimed in claim 3, wherein the concentrated portion is a layer formed by diffusion of the substance from the coating layer into the base region.

5. The rotary member as claimed in claim 3, wherein the substance of the coating layer is the same as the substance of the concentrated portion.

6. The rotary member as claimed in claim 5, wherein the hydrogen diffusion coefficient D of the substance is;

$D \leq 10^{-6}$ ($cm^2/s$) in a temperature range of $10^3/T(K) \geq 2$.

7. The rotary member as claimed in claim 5, wherein the hydrogen diffusion coefficient D of the substance is;

$D \leq 10^{-8}$ ($cm^2/s$) at a temperature of 300 (K).

8. The rotary member as claimed in claim 5, wherein the hydrogen diffusion coefficient D of the substance is;

$D \leq 10^{-5}$ ($cm^2/s$) in a temperature range of $10^3/T(K) \geq 2$.

9. The rotary member as claimed in claim 3, wherein the substance of the coating layer has a face-centered cubit lattice structure.

10. The rotary member as claimed in claim 9, wherein the substance having the face-centered lattice structure comprises nickel.

11. The rotary member as claimed in claim 9, wherein the substance having the face-centered lattice structure comprises copper.

12. The rotary member as claimed in claim 1, wherein the concentrated portion of the hydrogen blocking layer is a portion in which the concentration of the substance is increased.

13. A rolling bearing for a vehicle, comprising the rotary member as claimed in claim 1.

14. A rolling member for a toroidal continuously variable transmission, comprising the rotary member as claimed in claim 1.

15. A gear for a motor vehicle, comprising the rotary member as claimed in claim 1.

16. A rotary member having a contact surface for contacting with a mating body in relative motion, with the aid of a lubricant, the rotary member comprising:

a base region of a ferrous base material; and a hydrogen blocking layer formed in the contact surface for contacting with the mating body in the relative motion, the hydrogen blocking layer including a concentrated portion formed in the base region and made of a substance lower in hydrogen diffusion coefficient than the base material;

wherein the hydrogen blocking layer comprises a coating layer containing, as a main component, a substance which is lower in hydrogen diffusion coefficient than the base material, the coating layer being formed in the contact surface;

wherein the coating layer is a coating film formed by metal plating which is one of electroplating and electroless plating, the coating film being a surface layer forming the contact surface for contacting with the mating body.

17. A rotary member having a contact surface for contacting with a mating body in relative motion, with the aid of a lubricant, the rotary member comprising:

a base region of a ferrous base material; and a hydrogen blocking layer formed in the contact surface for contacting with the mating body in the relative motion, the hydrogen blocking layer including a concentrated portion formed in the base region and made of a substance lower in hydrogen diffusion coefficient than the base material;

wherein the hydrogen blocking layer comprises a coating layer containing, as main component, a substance which is lower in hydrogen diffusion coefficient than the base material, the coating layer being formed in the contact surface; and wherein the thickness of the coating layer is smaller than 0.1 micrometer.

18. A rotary member having a contact surface for contacting with a mating body in relative motion, with the aid of a lubricant, the rotary member comprising:

a base region of a ferrous base material; and a hydrogen blocking layer formed in the contact surface for contacting with the mating body in the relative motion, the hydrogen blocking layer including a concentrated portion formed in the base region and made of a substance lower in hydrogen diffusion coefficient than the base material wherein the concentrated portion is a portion in which the atomic concentration of the substance is higher than or equal to 5 atomic percent, and the concentrated portion extends from the surface of the base region to a depth greater than or equal to 100 nm.

19. A process of producing a rotary member having a contact surface for contacting with a mating body in relative motion with lubrication, the process comprising:

preparing a base region of a ferrous base material;

forming a coating layer of a low hydrogen diffusion substance which is lower in hydrogen diffusion coefficient than the base material, by metal plating which is one of electroplating and electroless plating, the coating film being a surface layer forming the contact surface for contacting with the mating body; and forming a concentrated portion by causing the low hydrogen diffusion substance of the coating layer to diffuse into the base material.

20. The process as claimed in claim 19, wherein the concentrated portion is formed by causing the low hydrogen diffusion substance of the coating layer to diffuse into the base material by an operation of putting the rotary member in frictional contact with a mating body.

* * * * *